US008169879B2

(12) United States Patent
Kamiguchi et al.

(10) Patent No.: US 8,169,879 B2
(45) Date of Patent: May 1, 2012

(54) OPTICAL RECORDING SYSTEM TO RECORD INFORMATION WITH LIGHT

(75) Inventors: Yuuzo Kamiguchi, Kanagawa-ken (JP); Sumio Ashida, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 48 days.

(21) Appl. No.: 12/616,214

(22) Filed: Nov. 11, 2009

(65) Prior Publication Data

US 2010/0124160 A1    May 20, 2010

(30) Foreign Application Priority Data

Nov. 19, 2008  (JP) ................................ 2008-296147

(51) Int. Cl.
*G11B 7/00* (2006.01)
(52) U.S. Cl. ......... 369/112.24; 369/112.05; 369/112.08; 369/112.2; 369/112.23
(58) Field of Classification Search ............... 369/112, 369/112.05, 112.08, 112.2, 112.23, 112.24
See application file for complete search history.

(56) References Cited

U.S. PATENT DOCUMENTS

| 6,359,852 | B1* | 3/2002 | Ueyanagi ...................... 369/118 |
| 6,404,722 | B1* | 6/2002 | Tseng et al. ............. 369/112.01 |
| 6,680,900 | B1* | 1/2004 | Takahashi et al. ............ 369/300 |
| 2001/0009541 | A1* | 7/2001 | Ueyanagi ................. 369/112.23 |

FOREIGN PATENT DOCUMENTS

| JP | 2004-213702 | 7/2004 |
| JP | 2007-207395 | 8/2007 |

OTHER PUBLICATIONS

Machine Translation of JP Publication No. 2004213702 by Fukuda Hiroaki in Jul. 29, 2004.*
Machine Translation of JP Publcation No. 2007207395 by Tsukagoshi T in Aug. 16, 2007.*
Hocheol Shin, et al., "All-angle Negative Refraction and Evanescent Wave Amplification Using One-Dimensional Metallodielectric Photonic Crystals", Applied Physics Letters, 89, 2006, pp. 151102-1 to 151102-3.
Keishi Ohashi, "Silicon Photo-Diode Using Surface-Plasmon Resonance", Laser Review, 35, 2007, pp. 572-576.
R. Merlin, "Radiationless Electromagnetic Interference: Evanescent-Field Lenses and Perfect Focusing", Science, vol. 317, Aug. 17, 2007, pp. 927-929.

(Continued)

*Primary Examiner* — Wayne Young
*Assistant Examiner* — Linh Nguyen
(74) *Attorney, Agent, or Firm* — Oblon, Spivak, McClelland, Maier & Neustadt, L.L.P.

(57) ABSTRACT

A multilayer optical recording system to record information with light includes a lens unit, a recording medium, and a microscopic drive unit. The lens unit includes a metamaterial lens or a plasmon lens. The metamaterial lens has a first dielectric member in which first microstructures are implanted in a substantially regular manner. The plasmon lens has an aperture. The aperture is a hole or a slit created in a metal film. The microscopic drive unit is configured to adjust a relative position between the lens unit and the recording medium. In addition, the principal plane is placed to be in contact with the lens unit or to have a gap between the principal plane and the lens unit. Furthermore, the second microstructures are arranged periodically in a direction substantially perpendicular to the principal plane of the recording medium.

4 Claims, 13 Drawing Sheets

OTHER PUBLICATIONS

Anthony Grbic, et al., "Near-Field Plates: Subdiffraction Focusing with Patterned Surfaces", Science, vol. 320, Apr. 25, 2008, pp. 511-513.

Haofei Shi, et al., "Beam Manipulating by Metallic Nano-Slits with Variant Widths", Optics Express, vol. 13, No. 18, Sep. 5, 2005, pp. 6815-6820.

Vladimir M. Shalaev, "Optical Negative-Index Metamaterials", Nature Photonics, vol. 1, Jan. 2007, p. 41-48.

Viktor A. Podolskiy, et al., "Near-Sighted Superlens", Optics Letters, vol. 30, No. 1, Jan. 1, 2005, pp. 75-77.

Japanese Office Action issued in Japanese Application No. 2008-296147 filed Nov. 19, 2008 (w/English translation).

* cited by examiner

MULTILAYER FILM OF DIELECTRIC MEMBER AND METAL

MULTILAYER FILM OF DIELECTRIC MEMBER AND METAL

OPTICAL RECORDING SYSTEM TO RECORD INFORMATION WITH LIGHT

CROSS REFERENCE TO RELATED APPLICATION

This application is based upon and claims the benefit of priority from the Japanese Patent Application No. 2008-296147, filed on Nov. 19, 2008, the entire contents of which are incorporated herein by reference.

FIELD OF THE INVENTION

The present invention relates to an optical recording system which records information with light.

DESCRIPTION OF THE BACKGROUND

At present, an optical recording system has been widely prevalent as a system which writes information into a recording medium using light (light wave), or reads information from a recording medium. The optical recording system is well known as a typical recording and reproduction system employing CD, DVD, etc. as a recording medium. In these optical recording systems, it is required to record as much information as possible into a smaller medium, and efforts are now being made to raise the storage density per unit area of a recording medium.

As a method for enabling high density recording, recording information physically in a smaller recording bit was employed before. In this method, it is important to narrow down a light spot to as small a size as possible. However, it is considered to be difficult even to narrow down the spot to one half of the wavelength of light at the shortest. Therefore, an optical recording system conventionally employs light with a shorter wavelength, thus enabling it to attain a high density recording. However, a present DVD system already employs a blue laser with a sufficiently short wavelength, and it is difficult to shorten the wavelength of the DVD system further more because of restriction from an optical system etc. Then, a novel method for attaining a higher density recording is required to break through such a plateau.

There exists a novel method as one of the methods for performing higher density recording. The method does not reduce a recording bit size (physical bit size) but records information three-dimensionally into a medium to enhance a recording density with maintaining the recording bit size. Whereas a conventional recording system records information with recording bits two-dimensionally onto a planar medium, the new method records information additionally in a thickness direction of the medium to enhance a recording density. A system employing two-photon absorption is restricted to record information just by a light spot position thereof. This allows the system to move focusing position of the lens by changing a focusing position for bits in a depth direction of the recording medium, thereby allowing it to record information three-dimensionally. For example, if the system has 100 recording layers, the system allows it to increase the recording density by a factor of 100 without reducing a light spot size. As a result, the system can attain an actual high density recording without changing the wavelength.

However, this method is considered to have difficulty to increase the recording density unlimitedly, and is restricted to have hundreds of recording layers at most by the following reasons:

(a) The recording medium must be thicker in accordance with an increase in the number of the recording layers;
(b) When a write-in position is deep in the recording medium, light will attenuate at the position to make it difficult to acquire sufficient intensity of the light; and
(c) It is optically difficult to focus light precisely to such a deep position of the recording medium.

In a conventional recording system employing two-photon absorption, a laminating distance is reduced to give rise to a cross-talk between layers, thus making it necessary to separate the layers from each other by about several μm. There exists a limit that several hundreds of layers can be included in a 1 mm-thick medium at most.

Another method to attain a high density recording is proposed. The method employs near-field light to realize a microscopic recording bit of which size exceeds a diffraction limit of light. A conventional optical recording system employs a normal optical lens system for far-field light. However, it is difficult for the recording system to make a spot size of light less than a half of the wavelength of light, and the recording density thereof is limited by the wavelength of light. It is possible to employ near-field light instead of far-field light. Near-field light can exist near substances such as a lens and a pinhole, and does not propagate through a free space. When near-field light is employed, the optical recording system can narrow down a spot size of light to a size less than the wavelength of light, thereby allowing it to form a microscopic recording bit.

Recently, there has been known a method for forming a spot of near-field light smaller than a diffraction limit of light. The method employs a lens based on a surface plasmon. There are mainly two kinds of lenses based on a surface plasmon. One is known as a metal lens ("Laser Research", Vol. 35, P. 572 (2007)). The lens is provided with a hole in a metal film. The hole is less than light wavelength in size, and is surrounded by concentric circular grooves. In this structure, the concentric circular grooves on the metal film are irradiated with light (light wave) to generate surface plasmons. The surface plasmons act so as to amplify light passing through the central hole of which size is less than the light wavelength. Therefore, the structure can remarkably increase an intensity of light, which can pass through the hole with the size less than the light wavelength, on the basis of surface plasmons, thereby allowing it to form a high-intensity spot of near-field light.

The other is a structure which is provided with concentric circular slits in a metal film, thereby forming a lens. The arrangement of the slits is optimized to allow it to form a near-field light spot in an area of near-field (Science 317, P. 927 (2007), Science 320, P. 511 (2008), Optics Express 13, P. 6815 (2005)).

The lens employing surface plasmons are referred to as the "plasmon lens" or "lens" simply in the description below. According to these plasmon lenses, it becomes possible to make a strong spot of near-field light in an area of the near field.

A spot size of near-field light is less than the diffraction limit depending on the light wavelength, and near-field light characteristically localizes near a pinhole or a lens. Therefore, near-field light cannot propagate long, and the intensity of near-field light attenuates exponentially. Also in an area far from the pinhole or lens, a portion of light emitted from a near-field light spot can propagate long as normal light. However, the portion of light lacks a component of near-field light, and can be focused by a normal lens on a small spot, whose size is about a half of the light wavelength, according to the diffraction limit of light. Therefore, it is considered to be difficult to focus light to form a light spot with a size of a half of the light wavelength in a deep area of the recording medium far from the pinhole or lens (by a distance of the light wavelength or more).

Recently, a complete lens (super lens) attracts much attention as a method for utilizing near-field light. The super lens is made of a material having a negative refractive index. The super lens is capable of propagating and focusing near-field light within the lens based on a material with negative electric permittivity and magnetic permeability. This lens allows it to focus light to form a fine spot, independently of the diffraction limit of light.

There are known several methods for making such a material with a negative refractive index. One of the methods is to implant microstructural bodies of metal or semiconductor in dielectrics, thus producing a metamaterial. Generally, the microstructural body is produced so as to be 10 to several 100 nm in size. The size of the microstructural body is considered to be preferably about a tenth of the light wavelength or shorter. The microstructural bodies of the metamaterial are produced so as to be sufficiently smaller than a light wavelength, thereby yielding an entirely averaged electric permittivity and magnetic permeability without a light wave blocked by each microstructural body.

It is revealed that a negative refractive-index material has an effect for amplifying near-field light, and a flat plate of the negative refractive-index material allows it to acquire a high resolution beyond a diffraction limit of light, thereby serving as a lens. In this way, a lens made of the negative refractive-index material attracts much attention as a lens capable of writing in microscopic bits beyond a diffraction limit of light.

However, the following is well known. That is, it is difficult to form a nano spot even by using a lens made of the negative refractive-index material in an area far from the lens by a distance of a light wavelength or more. The spot size exceeds a diffraction limit of light. This arises from a rapid attenuation of the near-field component when the near-field component is far from the lens by a distance more than a light wave length, even though the negative refractive-index material has an effect for amplifying near-field light. Particularly, when the negative refractive-index material has a dielectric loss, the attenuation of light becomes significant, and is difficult to solve essentially.

Even though near-field light localizing only near substances such as a lens or a pinhole allows it to make a spot size of light microscopic. Only a very thin surface of a recording medium can be irradiated with the near-field light. This leads to just a single layer recording, thereby giving rise to a limit on enhancement of the recording density for the optical recording.

A system which performs a three-dimensional recording using a negative refractive-index material is proposed (JP-A 2007-207395 (KOKAI)). JP-A 2007-207395 (KOKAI) discloses that employing the lens formed of the negative refractive-index material allows it to acquire a microscopic bit size of light less than a light wavelength and to realize a three-dimensional recording. However, even employing a super-resolution lens of the negative refractive-index material is considered to have a difficulty in focusing light to form a microscopic light spot in an area far from the lens with overcoming a light diffraction limit. This is because the super-resolution lens of the negative refractive-index material acquires a super resolution using an amplifying phenomenon of near-field light whereas the lens cannot actually propagate near-field light long as a result of a dielectric loss thereof. For this reason, it is impossible to acquire a sufficient focusing length by just using the negative refractive-index material for a lens, thereby making it difficult to apply the lens to a three-dimensional recording.

Furthermore, there is discovered a phenomenon that a light beam whose diameter is less than the wavelength thereof propagates in a certain kind of metamaterial without diffusing and changing the diameter thereof. The phenomenon is called a "canalization phenomenon" or a "self-focusing phenomenon". That is, generally, even a light beam focused into a fine beam whose diameter is less than the wavelength thereof will expand naturally as a result of a diffraction phenomenon while propagating in a normal substance. However, even such a light beam focused finely can propagate directly without diffusing in the metamaterial, being called a canalization phenomenon. There are known several materials to cause such a phenomenon. It is disclosed that a multilayer film formed by laminating dielectric films and metal films or by laminating dielectric films and semiconductor films causes a canalization phenomenon in a direction perpendicular to the film surface of the multilayer film (Physical Review B, Vol. 74, P. 75103 (2006)). It is also disclosed that some kinds of photonic crystals cause a canalization phenomenon (IEEE Journal of selected topics in quantum electronics 8, P. 1246 (2002)). However, the reference does not suggest the application of the canalization phenomenon to information recordings. Moreover, in the canalization phenomenon, a light beam propagates in a straight line without diffusing or being focused. That is, it is impossible to selectively irradiate a specified area on a propagating line of the light beam with light, thereby making it substantially impossible to apply the canalization phenomenon to multilayer recordings.

SUMMARY OF THE INVENTION

According to a first aspect of the invention, a multilayer optical recording system to record information with light includes a lens unit, a recording medium, and a microscopic drive unit. The lens unit includes a metamaterial lens or a plasmon lens. The metamaterial lens has a first dielectric member in which first microstructures are implanted in a substantially regular manner. The first microstructures are formed of a metal or a semiconductor. The plasmon lens has an aperture. The aperture is a hole or a slit created in a metal film. The recording medium has a principal plane, and a second dielectric member in which second microstructures are implanted. The second microstructures are formed of a metal or a semiconductor. The microscopic drive unit is configured to adjust a relative position between the lens unit and the recording medium to form a light spot in the second dielectric member or the second microstructures. In addition, the principal plane is placed to be in contact with the lens unit or to have a gap between the principal plane and the lens unit. Furthermore, the second microstructures are arranged periodically in a direction substantially perpendicular to the principal plane of the recording medium.

According to a second aspect of the invention, a multilayer optical recording system to record information with light includes a light source unit, a recording medium, and a selection circuit. The light source unit emits a light spot of the light, whose size is smaller than a wavelength of the light. The recording medium includes a metamaterial formed of a laminated structure with dielectric layers, and metal or semiconductor layers laminated periodically. The selection circuit selects one layer of the dielectric layers and two layers sandwiching the one layer so as to record information in the one layer with the light spot emitted from the light source unit, the two layers being selected from the metal or semiconductor layers. In addition, the recording medium is placed to be in contact with the light source unit or to have a gap between the recording medium and the light source unit. Furthermore, a canalization phenomenon for a beam of the light takes place at a frequency of the light in the recording medium. The beam of the light maintains a width thereof smaller than the wavelength of the light in the recording medium. The light source unit emits the light. The light source unit has a light spot source whose size is smaller than a wavelength of the light. The recording medium includes a metamaterial formed of a laminated structure with dielectric layers, and metal or semiconductor layers laminated periodically. The selection circuit selects one layer of the dielectric layers and two layers sandwiching the one layer to record information in the one layer with a light spot emitted from the light spot source. The two layers are selected from the metal or semiconductor layers. In addition, the recording medium is placed to be in contact with the light source or to have a gap between the recording medium and the light source. Furthermore, a canalization phenomenon takes place for a light beam in the recording medium, the light beam having a width smaller than the wavelength thereof.

BRIEF DESCRIPTION OF DRAWINGS

The accompanying drawings, which are incorporated in and constitute a part of this specification, illustrate embodiments of the invention and together with the description, serve to explain the principles of the invention.

DETAILED DESCRIPTION OF THE EMBODIMENTS

Embodiments of the present invention are explained below with reference to accompanying drawings.
First Embodiment
FIG. 1 is a view schematically illustrating a fundamental configuration of a multilayer optical recording system according to a first embodiment of the present invention.

Figure 1:
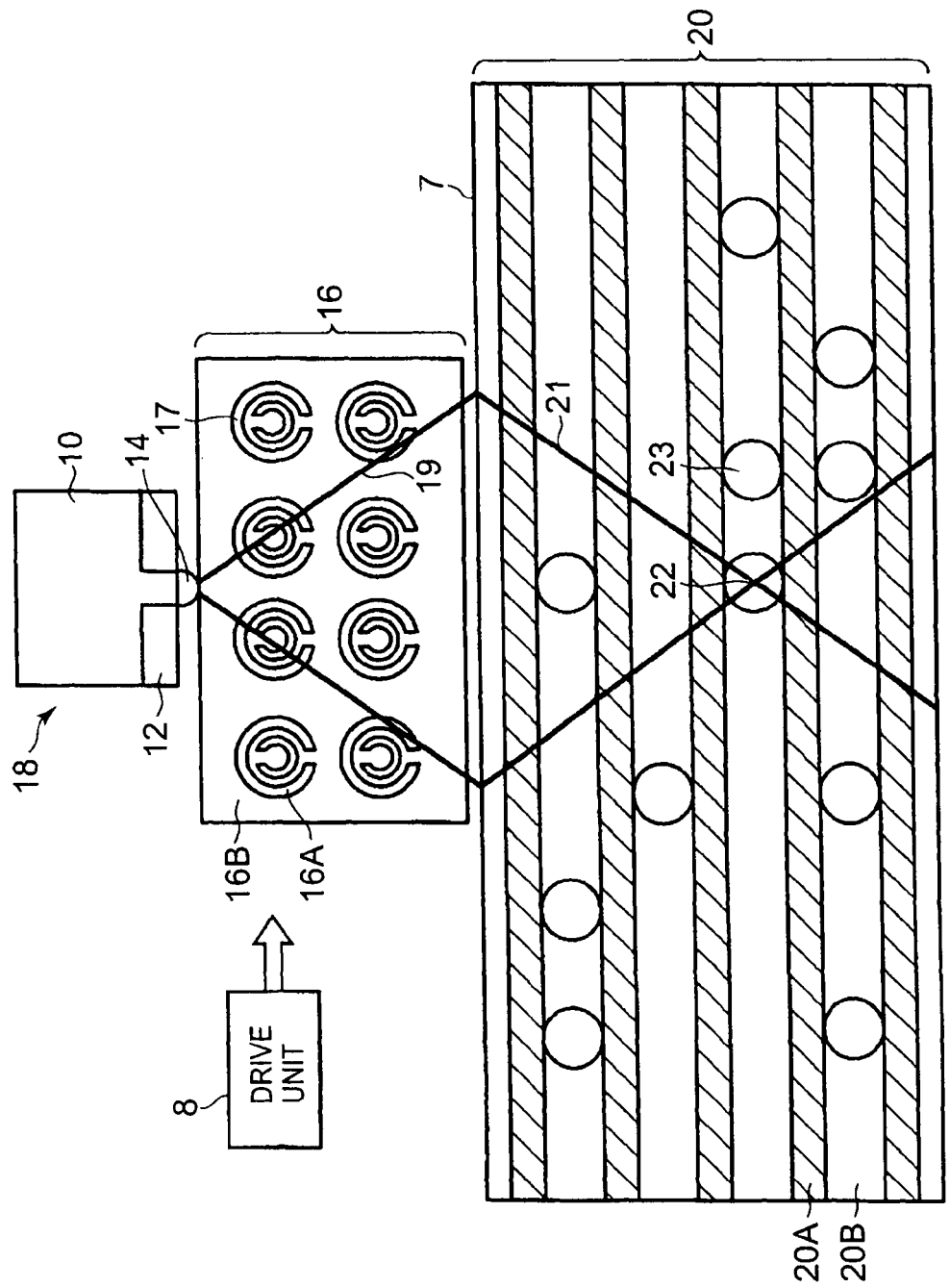
FIG. 1 is a view schematically illustrating a fundamental configuration of a multilayer optical recording system according to a first embodiment of the present invention.

In the multilayer optical recording system shown in FIG. 1, a nano light source unit 18 is provided with a laser light source 10, an aperture 12 arranged on the emitting side of the laser light source 10 and a nano light source 14 defined by the aperture 12. The nano light source 14 of the nano light source unit 18 makes a laser light wave pass through a nano hole at the aperture 12 to form a light spot with a diameter of 1 nm to 100 nm.

Alternatively, this nano light source 14 can be prepared without using the laser light source 10. That is, an aperture is made by forming a circular hole with a diameter of 1 nm to 100 nm in a film of metals such as Cr, Au, Ag, etc. Then, a laser beam is guided from an optical fiber to the circular hole of the aperture, thus producing the nano light source 14. Alternatively, an end face of an optical fiber is covered with a metal film, and a circular hole with a diameter of 1 nm to 100 nm is formed in the end face to emit near-field light therefrom, thus producing the nano light source 14. Furthermore, the nano light source may be produced employing an effect for amplifying near-field light based on metal plasmons. Then, high intensity near-field light with a beam diameter of several nm to 100 nm is preferably employed. As the nano light source, a solid immersion lens can also be employed for simplicity.

A lens unit 16 is arranged to be in contact with the nano light source 14. The lens unit 16 includes a metamaterial plate with microstructures 16A implanted into a dielectric member 16B so that metallic or semiconducting microstructures 16A are arrayed in a matrix or periodically, i.e., arranged regularly. A constituent substance for the metamaterial, which is employed for the lens unit 16, preferably has a large positive refractive index. Resonator structures, such as a split-ring resonator structure or a pair-metal rod structure are implanted into the dielectric member 16B as the metallic or semiconducting microstructures in order to obtain a large positive refractive index. In a resonator structure 17 as the microstructure 16A, the resonant frequency of the resonator structure 17 is set to a value slightly larger than the frequency of light so that the resonator structure 17 shows a large positive magnetic permeability μ, thereby allowing it to enlarge the positive refractive index for the metamaterial. A lens including the metamaterial is called a metamaterial lens, and is referred to simply as a lens hereinafter.

Figure 2:
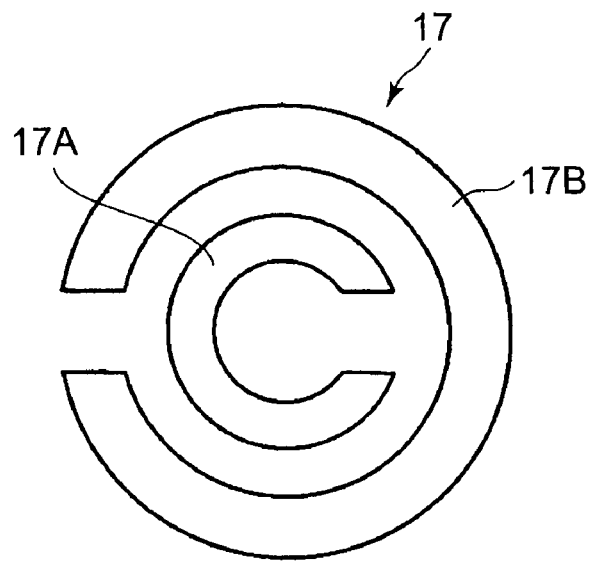
FIG. 2 is a view illustrating a split ring resonator to be arrayed in the dielectric member 16B.

FIG. 2 is a view illustrating a split ring resonator 17 to be arrayed in the dielectric member 16B. The split ring resonator 17 shown in FIG. 2 includes an inner circular strip line 17A and an outer circular strip line 17B, both arranged concentrically. A portion is removed in the inner and outer circular strip lines 17A, 17B.

Figure 3:
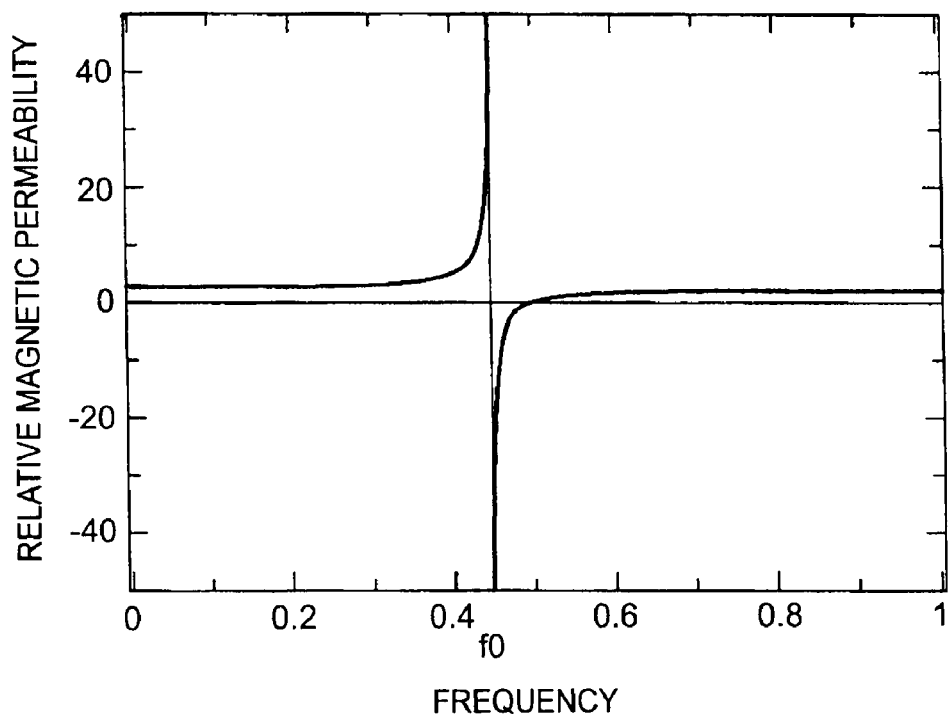
FIG. 3 is a graph showing a characteristic of relative magnetic permeability versus frequency of light.

FIG. 3 is a graph showing a characteristic of relative magnetic permeability versus frequency of light. The vertical and horizontal axes represent relative magnetic permeability and frequency of light, respectively. As is obvious from FIG. 3, the relative magnetic permeability shows a negative value in a range of frequency higher than the frequency f0 corresponding to a resonant frequency, and a positive value in a range of frequency lower than the frequency f0. The relative magnetic permeability changes abruptly crossing the line at the resonant frequency. Also as is obvious from FIG. 3, it is possible to acquire a large positive value of magnetic permeability at a frequency slightly lower than the resonant frequency.

Thus, a large positive value of magnetic permeability is given to the resonator 17 to enhance the refractive index, thereby enabling it to heighten a frequency of light capable of propagating in the lens. This also allows it to propagate a high frequency component of near-field light. It has been impossible to propagate such a high frequency component of near-field light in a vacuum. Therefore, a value of the positive refractive index n of the metamaterial is increased greatly to allow it to propagate a high frequency component from the nano light source. The high frequency component from the nano light source cannot normally propagate in a vacuum. The light emitted from the nano light source 14 propagates through the lens unit 16 with spreading spherically as shown by the numeral 19. It should be noted that the lens unit 16 is not necessarily required to have a function for focusing light as a unit, although it is so called "lens".

The material employed for the dielectric member 16B is preferably transparent for a frequency of light emitted from the nano light source 14. Specifically, oxides such as $SiO_2$, $Al_2O_3$, MgO, ZnO, NiO, etc. can be employed for visible light. The materials for the dielectric member 16B can employ semiconductors, such as Si, ZnSe, GaAs, AlGaAs, etc. for infrared light. Although a dielectric constant $\in$ preferably exceeds 2, the constant $\in$ is not necessarily limited to this.

Metals or semiconductors for the microstructure 16A to be implanted preferably have a high conductivity. Specifically, metals, such as Au, Ag, Cu, and alloys of these, can be employed for visible light. Materials for infrared light include degenerated semiconductors such as MgO, ZnO, NiO, etc. which are transparent oxides doped sufficiently to have carriers induced. Alternatively, semiconductors, such as Si, ZnSe, GaAs, etc., which are doped to have carriers induced, may be employed for infrared light.

The light having propagated to pass through the lens unit 16 reaches a recording medium 20 facing the lens surface on the side opposite to the nano light source 14, and further propagates through the recording medium 20. The lens unit 16 is placed to be in contact with a flat principal plane (an upper surface) 7 of the recording medium 20, or to be not in contact with the principal plane with a small gap. Here, the length of the small gap is set to be shorter than the wavelength of light. The recording medium 20 is made to be a laminated structure with thin metal or semiconductor layers 20A and thin dielectric layers 20B laminated. That is, the recording medium has a structure of a photonic crystal when viewed in a thickness direction (a depth direction) thereof. The principal plane of the recording medium is defined as a plane perpendicular to the thickness direction thereof. In other words, two kinds of layers 20A, 20B are arranged so as to have a periodic structure in a direction perpendicular to the principal plane of the recording medium 20. Therefore, a frequency dispersion relation is given for light propagating within the recording medium 20 as well as within the lens unit 16.

The frequency dispersion relation has a band branch of a negative refractive index near a frequency corresponding to the resonant frequency of a surface plasmon in the one-dimensional photonic crystal where the metal layers 20A and the dielectric layers 20B are laminated alternately.

Appropriately selecting metallic materials, dielectric materials and a lamination pitch for the recording medium 20 allows it to set the frequency of light from the nano light source 14 to a frequency region of the band branch of the negative refractive index. Then, the recording medium 20 has a negative refractive index for the light from the nano light source 14. Therefore, as shown by the numeral 21 in FIG. 1, the light having reached the surface of the recording medium 20 is focused in the recording medium 20 to form a nano light spot 22 therein. It is possible to propagate high frequency components of near-field light within the recording medium 20, although the high frequency components cannot be normally propagated in a vacuum. That is, it is possible to form the nano spot 22 at a focusing point within the recording medium 20.

In FIG. 1, the numeral 23 shows an information bit formed as a result of the formation of the nano spot 22.

Figure 4:
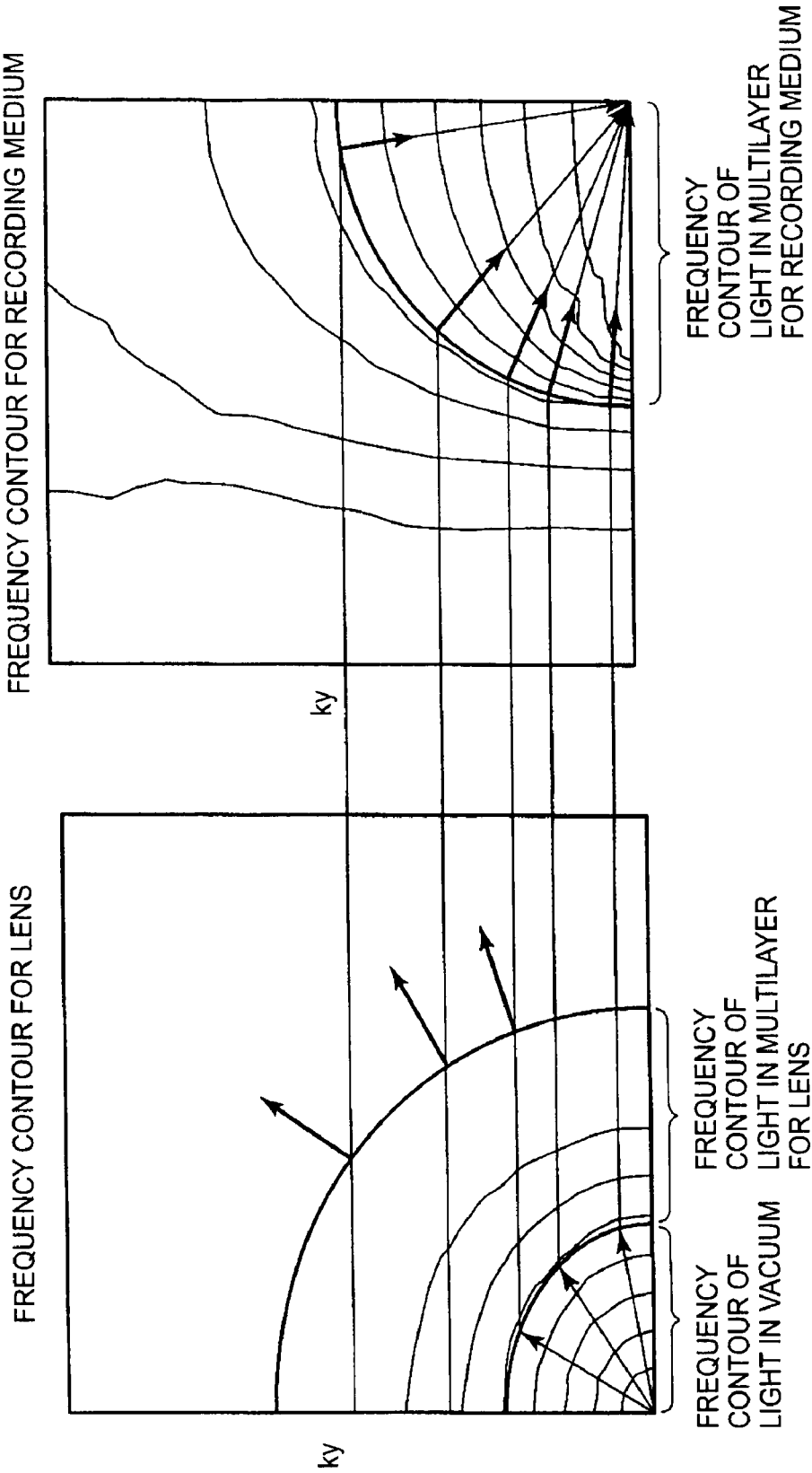
FIGS. 4A and 4B are graphs illustrating frequency contours for a lens and a recording medium.

FIGS. 4A and 4B are graphs illustrating frequency contours for the lens unit 16 and the recording medium 20 shown in FIG. 1. Since a group velocity of light is normal to the frequency contours shown in an arc in FIGS. 4A and 4B, the light is emitted in a radial fashion from the nano light source 14 as shown by the arrows in FIG. 4A. When the light travels into the recording medium 20, a wavenumber ky, i.e., a wavenumber component parallel to the top surface of the recording medium 20 is conserved. For this reason, the light propagating into the recording medium 20 transits from a state in FIG. 4A to a state in FIG. 4B with conserving the same component ky. Therefore, the light is focused into a point within the recording medium 20, thereby producing the nano spot within the recording medium 20. In order to get rid of an aberration at this time, it is preferable that the frequency contour of the lens unit 16 becomes a mirror image of the frequency contour of the recording medium 20, and vice versa.

In addition, the size of the nano spot 22 is limited approximately to the lamination pitch of the recording medium 20. Therefore, the lamination pitch is preferably short. Even a normal method allows it to focus light to a size of a half of the wavelength of the light. Accordingly, the lamination pitch is required to be less than a half of the wavelength of light within the dielectric member employed in order to acquire a super-resolution.

As the material for the dielectric layer 20B, the material same as that of the dielectric member 16B in the lens unit 16 may be employed. In order to allow it to record information, it is particularly preferable to employ a material where information can be recorded at a position of the nano spot 22 as the dielectric layer 20B.

A highly conductive material can be employed for the metal or semiconductor layer 20A. Particularly, it is more preferable to employ a semiconductor, as the plasma resonant frequency of semiconductor can be controlled by a doping level of the semiconductor when forming the semiconductor layer 20A with a doped semiconductor having carriers induced therein.

Alternatively, the dielectric layer 20B may be formed of a material of two-photon absorption. For example, an organic material of two-photon absorption may be employed for the dielectric layer 20B. Specifically, photochromic materials, such as diarylethene and diarylethene-doped PMMA can also be employed for the dielectric layer 20B. It is also possible to record an information bit 23 causing a photoisomerization reaction with urethane-urea copolymer. In addition, optical irradiation causes electron localization in a photorefractive material, thus allowing it to optically record an information bit 23 by a change in the refractive index of the photorefractive material. It is also possible to optically record an information bit 23 using a change in the refractive index of an isomerization material, fluorescence dye, etc. The refractive index of the isomerization material changes in accordance with a change from trans-isomer into cis-isomer by optical irradiation. Transmittance and reflectance also change with the change in the refractive index of these materials, thus allowing it to optically record an information bit 23 using the change in the transmittance and reflectance. However, the optical irradiation causes a change into isomer or a change in molecular state in these materials. That is, a change in the molecular state or the crystalline state of these materials allows it to record information bits.

When employing a material with a changeable fluorescence characteristic, a femtosecond or picosecond laser is used as a light source 18 to form a light spot with a high energy density within the recording medium 20, thereby causing a two-photon absorption phenomenon therein. This allows it to change a fluorescent emission characteristic of a portion irradiated with the light spot, and thus to optically write information by the change in the fluorescent emission characteristic. It is possible to use the two-photon absorption phenomenon also at the time of read-out when the write-in has been performed using the change in the fluorescent emission characteristic. It is possible to read out information by detecting a two-photon fluorescent emission from the portion once irradiated with a light spot for write-in. A light spot with energy lower than the energy of the light spot for write-in is used for the detecting, i.e., read-out.

A luminescence phenomenon is not limited to the fluorescent emission. It is also possible to read out information using a relaxation phenomenon where electrons or molecules exited by light irradiation relax to emit light.

The sequence of write-in/read-out can not only conform to a method of a conventional three-dimensional optical recording, but also it is possible to write information into a microscopic recording bit 23 whose size exceeds an optical diffraction limit of light used for write-in/read-out, and to read out information from the microscopic recording bit.

In the optical recording system, a thickness of the lens unit 16 corresponds to a depth at which the nano spot 22 is formed. Therefore, in order to realize the multilayer recording, it is preferable to prepare several thickness lenses 16-1 to 16-3 and light sources to be used for these lenses.

Figure 5:
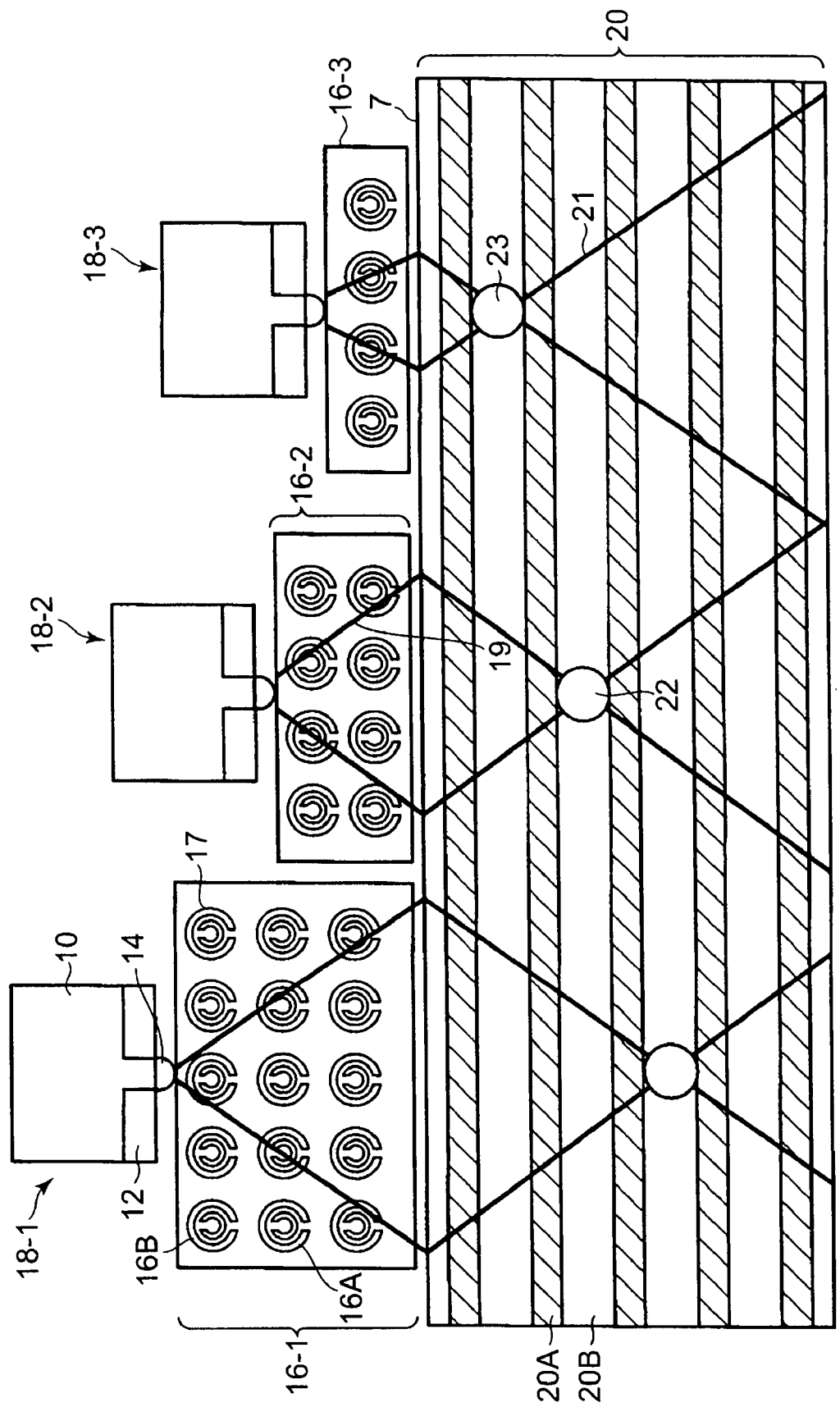
FIG. 5 is a view schematically illustrating a specific multilayer optical recording system according to the first embodiment.

In the optical recording systems shown in FIGS. 1 and 5, the lens unit 16 and the surface of the recording medium 20 can be separated from each other by a distance approximately of the wavelength of light. Then, the lens can be moved up and down by 100 nm to 1 μm depending on the wavelength. Moving the lens unit 16 up and down allows it to select the dielectric layer 20B to which light is focused. Once the dielectric layer 20B is selected, the lens is moved together with the light source unit 18 to produce a nano spot 22 within the dielectric layer 20B. For this reason, a drive unit 8 is provided so as to microscopically move the lens at one with the light source unit 18 in a direction perpendicular to the principal plane of the recording medium, as shown in FIG. 1. The movement of both the lens unit 16 and the light source unit 18 is limited to a micromotion by the drive unit 8 approximately within a range of the wavelength of light. Alternatively, the drive unit 8 may be configured so as to move both the lens unit 16 and the light source unit 18 parallel to the principal plane of the recording medium 20 in order to select a recording area in the dielectric layer 20B selected (for tracking). It should be noted that the drive unit 8 is omitted for simplicity in FIG. 5. In the system shown in FIG. 5, the respective combinations of the lenses 16-1 to 16-3 and light source units 18-1 to 18-3 are provided with one drive unit 8. In the case shown in FIG. 5, three drive units 8 may drive three combinations of the lenses 16-1 to 16-3 and light source units 18-1 to 18-3, respectively, or a single drive unit 8 may entirely drive the respective combinations of the lenses 16-1 to 16-3 and light source units 18-1 to 18-3.

Figure 6:
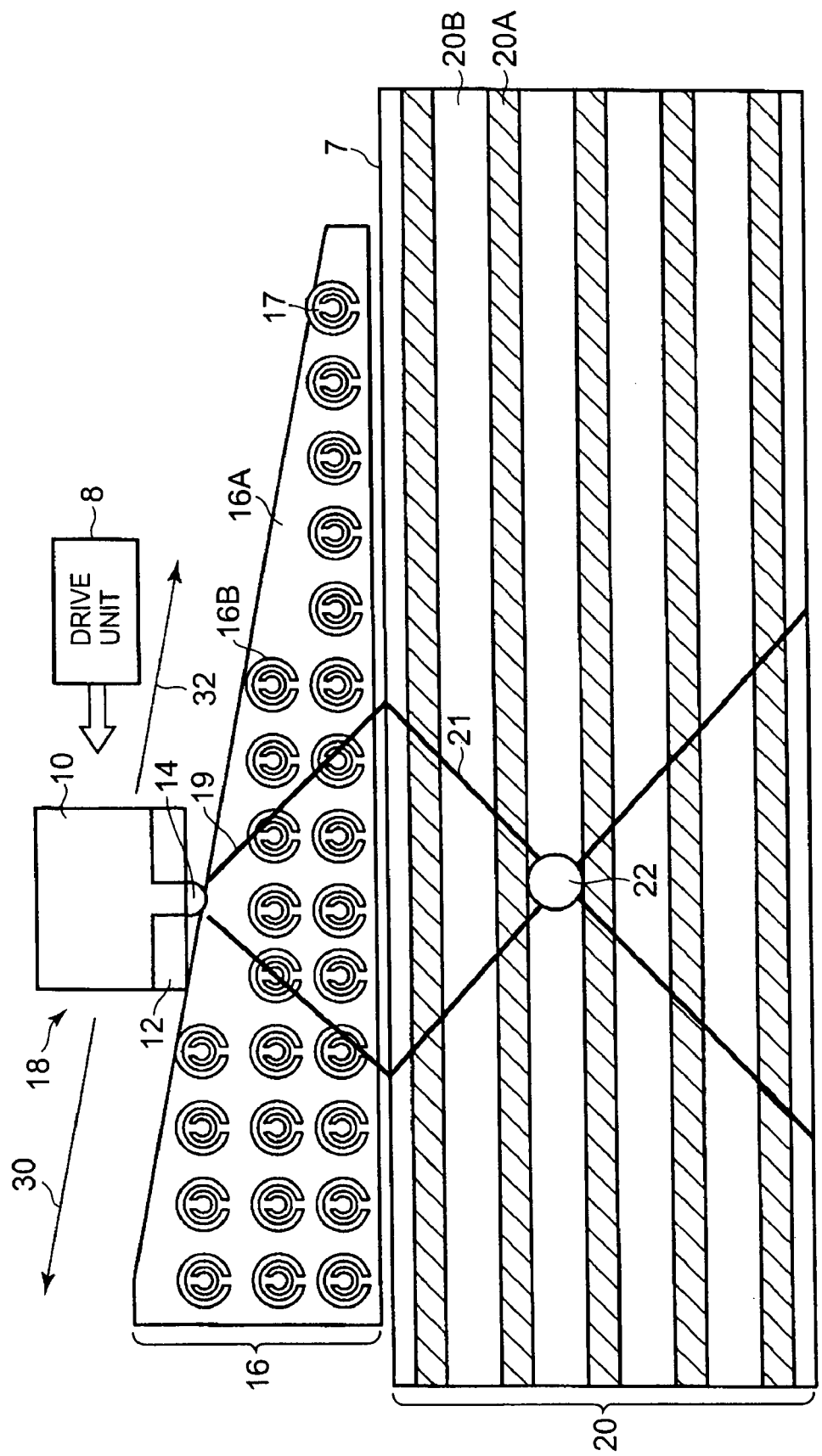
FIG. 6 is a view schematically illustrating another specific multilayer optical recording system according to the first embodiment.

As shown in FIG. 6, the lens unit 16 with a laminated structure is formed in a wedge shape, and the nano light source 14 can be driven by the drive unit 8 to slide on the sloping surface of the wedge-shaped lens unit 16, thereby allowing it to select an area through which light emitted from the nano light source 14 passes, and to select a position at which the nano spot 22 is formed in accordance with the thickness of the lens area selected. That is, it is possible to continuously change the thickness of the used area of the lens unit 16 by moving the nano light source 14. This allows it to continuously change a depth at which the nano spot 22 is formed within the recording medium 20. Also in the system shown in FIG. 6, it is possible to separate the nano light source 14 from the surface of the lens unit 16 by an order of the light wave length, thus allowing it to change a distance between the nano light source 14 and the sloped surface of the lens unit 16, and to add the distance to the thickness of the used area of the lens unit 16 by moving the nano light source 14. That is, the vertical motion of the nano light source 14 may contribute to determine a position of the nano spot 22 formed within the recording medium 20. The vertical motion of the nano light source 14 may be stepwise in accordance with a movable distance prescribed less than the light wavelength to select a layer to be recorded in the laminated structure.

Figure 7:
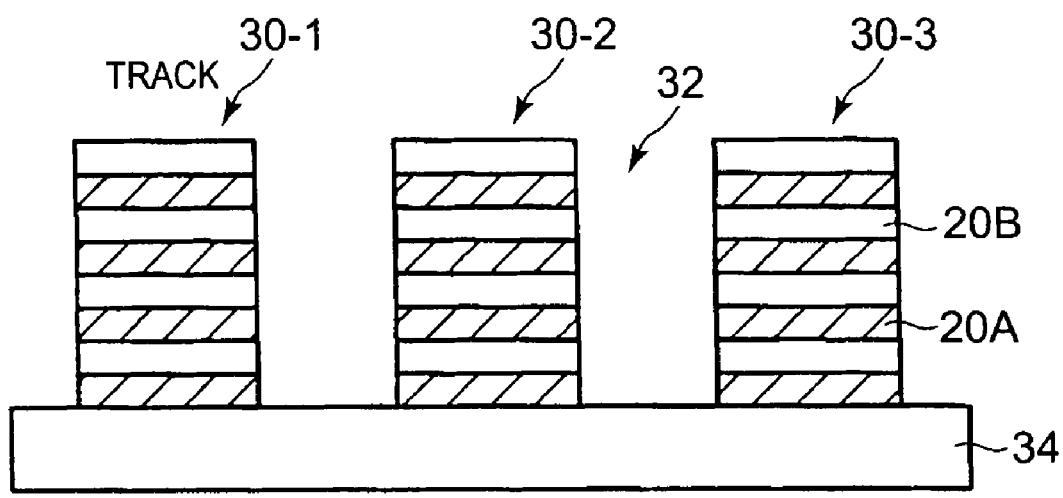
FIG. 7 is a view schematically illustrating a recording medium according to a modified example of the first embodiment.

Alternatively, as shown in FIG. 7, the recording medium 20 may be partitioned into recording segments 30-1 to 30-3 which correspond to tracks to be recorded. The recording medium may be processed so that the recording segments 30-1 to 30-3 are separated from each other by a width almost the same as the width of the bit 23. The respective segments 30-1 to 30-3 may be formed so that a size (width) thereof is sufficiently larger than the width of the bit 23, or may be formed so as to be separated from each other by a small gap 32.

As mentioned above, the lens unit 16 has a positive refractive index, and the recording medium has a negative refractive index in the multilayer optical recording system. The present invention is not necessarily limited to this configuration. Alternatively, the lens unit 16 and the recording medium 20 may have a negative refractive index and a positive refractive index, respectively, thus providing another multilayer optical recording system with the reverse configuration. A multilayer optical recording system with the reverse configuration can provide almost the same performance as the above-described. However, it is preferable to provide the recording medium with a negative refractive index, as the recording medium with a negative refractive index is less vulnerable to fluctuation of a laser frequency. It is more difficult to produce a material with a high positive refractive index than to produce a material with a negative refractive index. Therefore, it is preferable to employ a material with a negative refractive index for the recording medium 20. The material with the negative refractive index has an effect for amplifying near-field light. From this point, it is preferable to provide the recording medium 20 with the negative refractive index.

Second Embodiment

A second embodiment according to the invention is explained with reference to FIG. 8. The same reference numerals as those used in FIGS. 1 to 7 will be used to denote the same or like portions throughout the detailed description and the figures below, thus being omitted.

Figure 8:
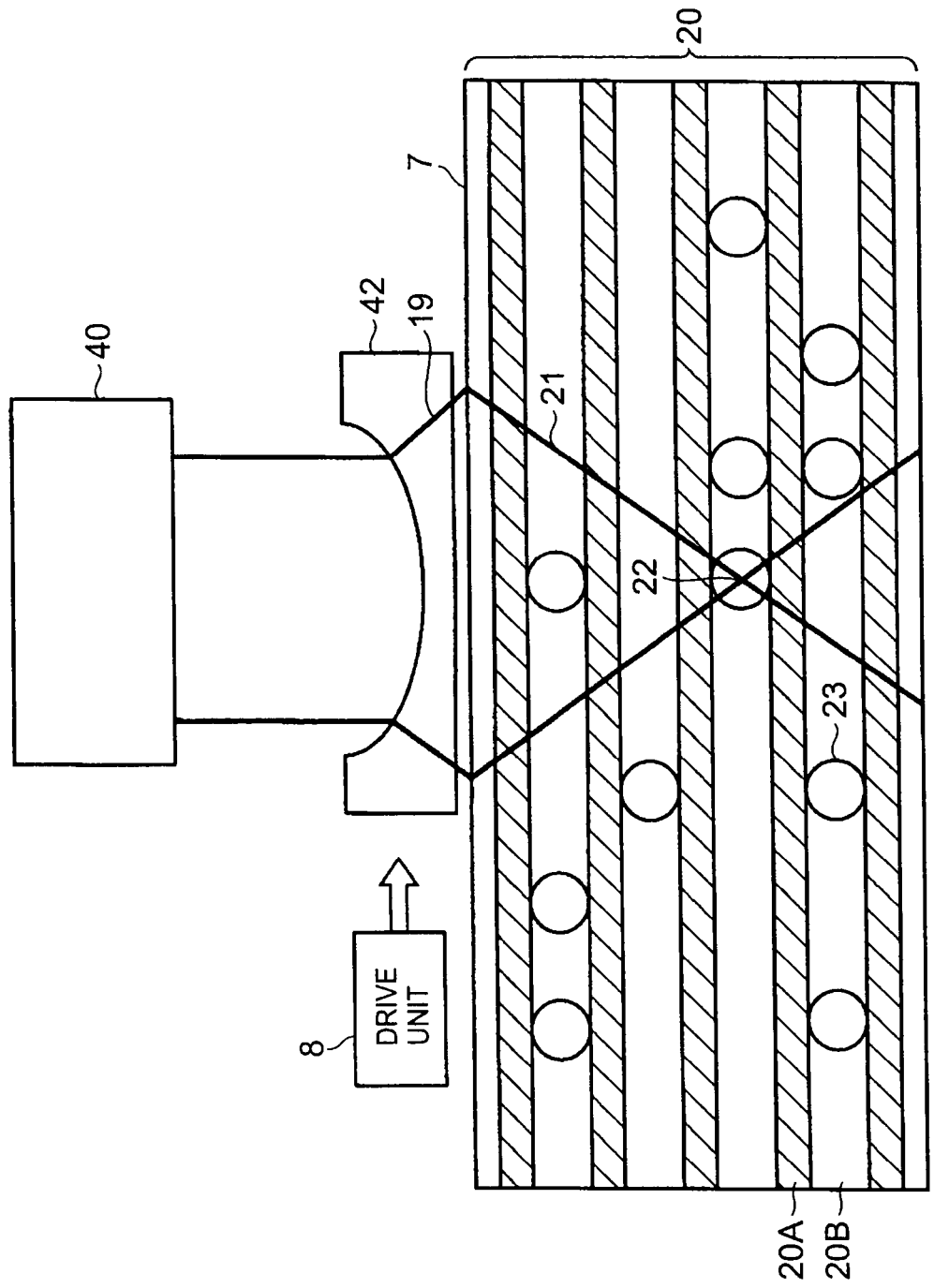
FIG. 8 is a view schematically illustrating a fundamental configuration of a multilayer optical recording system according to a second embodiment of the present invention.

In a multilayer optical recording system shown in FIG. 8, a recording medium 20 is the same as that in the first embodiment, and is provided with a negative refractive index. However, a light source and a lens are replaced with different ones therein. That is, a normal laser light source 40 is used as a light source, and a collimated laser beam is directed to a concave lens 42. The concave lens 42 spreads the collimated laser beam to be directed to the recording medium 20. The spread laser beam propagates into the recording medium, and is focused on a deep position in a light-propagating direction within the recording medium 20 to form the nano spot 22, as the recording medium 20 has a negative refractive index with a lens effect therein. The information bit 23 is recorded as a result of the nano spot formed.

Figure 9:
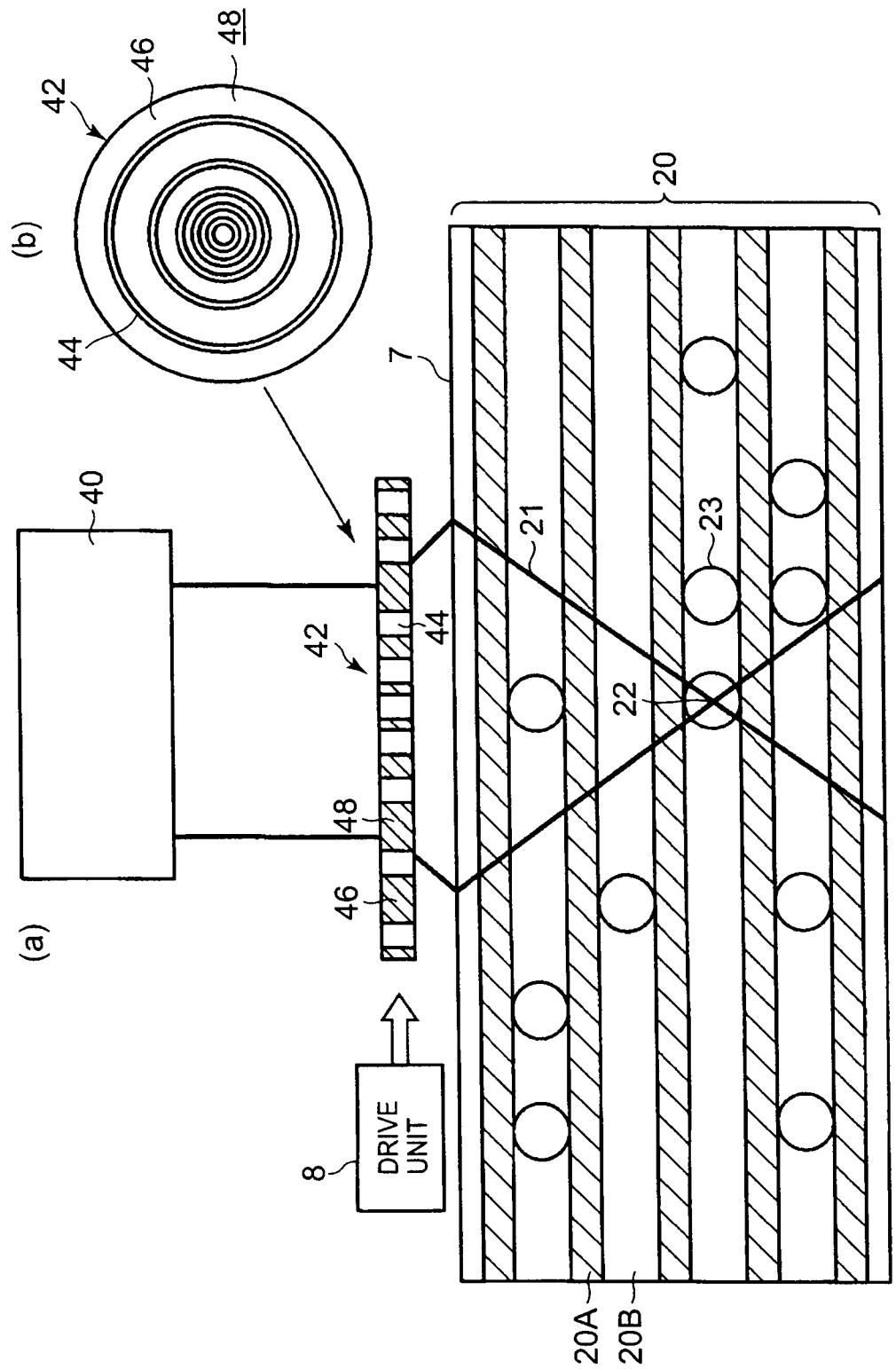
FIG. 9 is a view schematically illustrating a recording medium according to a modified example of the second embodiment.

As such a condenser lens, a plasmon lens 48 can be employed. The plasmon lens is provided with concentric circular slits 44 in a metal film 46 as shown in FIG. 9, and is irradiated with light to generate plasmons on the surface thereof. In the plasmon lens 48 employing such nano slits 44, which is well designed, near-field light is produced near the nano slits 44 by irradiating the slits 44 with light. The near-field light produced propagates through the recording medium 20 to allow it to form a nano spot with a size exceeding the limit by the light wavelength. The plasmon lens to be placed close to the recording medium may be provided with a slit like the slit of a Fresnel lens so that the plasmon lens serves as a convex lens. The slits 44 are formed more densely in the outer area of the plasmon lens 48 than in the inner area thereof to allow it to give an effect of a convex lens to the plasmon lens 48, thereby producing a nano spot with enhanced near-field light within the recording medium 20. It is possible to place the plasmon lens 48 sufficiently close to the recording medium 20. Therefore, a high frequency component of near field light at the nano slits 44 of the plasmon lens 48 can also reach the recording medium 20 without much attenuation. As a result, a spot sufficiently focused can be given to the recording medium 20.

When the plasmon lens 48 is placed slightly far from the recording medium 20, the slits can also be arranged so that the plasmon lens may serve as a concave lens. The slits 44 are formed more densely in the inner area of the plasmon lens 48 than in the outer area thereof to allow it to give an effect of a concave lens to the plasmon lens 48. And, the plasmon lens 48 is combined with the recording medium 20 with a negative refractive index to allow near-field light to propagate through the recording medium 20 without attenuation, thereby producing a nano spot 22 at a focusing position (deep in the recording medium). It is possible to place the plasmon lens 48 sufficiently close to the recording medium 20. Therefore, a high frequency component of near field light at the nano slits 44 of the plasmon lens 48 can also reach the recording medium 20 without much attenuation. As a result, a spot sufficiently focused can be given to the recording medium 20.

In the above embodiments, it is assumed to employ a two-photon absorption material for the dielectric layer 20B, while a method for retaining recorded information is not limited to this material.

Figure 10:
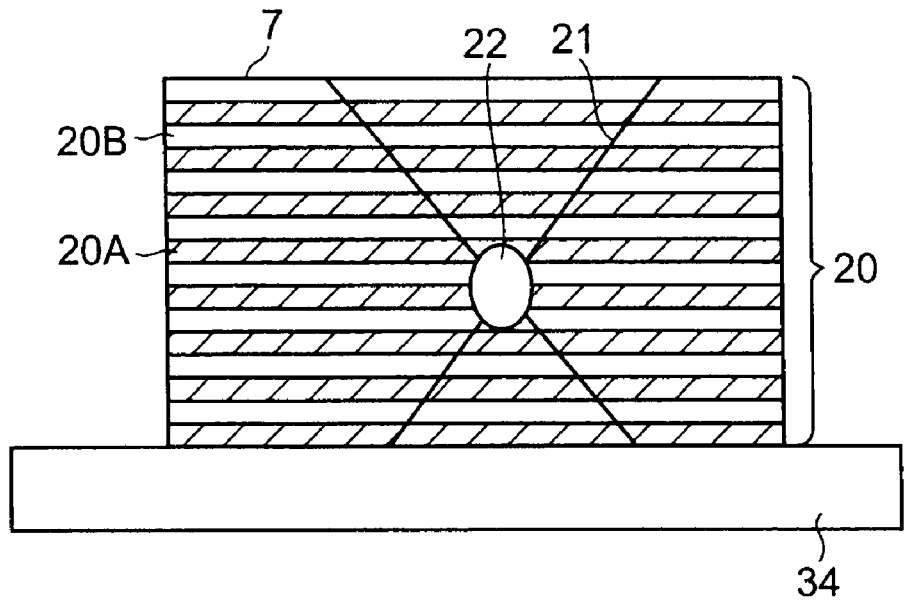
FIG. 10 is a view schematically illustrating a recording medium according to another modified example of the second embodiment.

Alternatively, as shown in FIG. 10, when the dielectric layer 20B includes a ferroelectric material, an electric field of the light spot 22 can reverse a polarization direction of the ferroelectric layer 20B to write information. Furthermore, an external electric field may be applied subsidiarily to the recording medium 22 in addition to the electric field of the light spot 22, thus making it easy to generate dielectric polarization. For read-out of information, a recorded portion with polarization reversed in the dielectric layer 20B is irradiated with light, thereby generating a second harmonic wave to reproduce the information bit 23.

Figure 11:
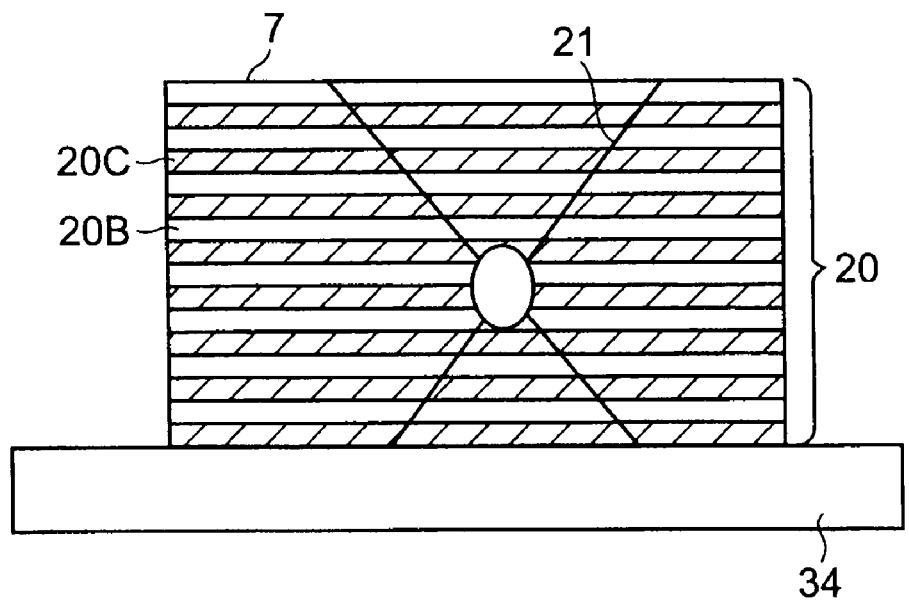
FIG. 11 is a view schematically illustrating a recording medium according to a further modified example of the second embodiment.

As shown in FIG. 11, the metal layer 20A may be replaced with a magnetic metal layer 20C to form the recording medium 20. Then the recording medium 20 may be irradiated with circular polarized light to form the nano spot (light spot). The circular polarized light generates a strong magnetic field by the circular electric field thereof, thereby causing a direct switching of magnetization in the magnetic metal layer 20C to result in write-in of information. The magnetic field generated by the light spot changes the direction thereof upward or downward in the magnetic metal layer 20C, depending on right-handed circularly polarized light or left-handed circularly polarized light with which the magnetic metal layer 20C is irradiated. A strong magnetic field is generated at a position of the light spot in the magnetic metal layer 20C, and has a direction in accordance with circular polarization direction of light. For read-out, linear polarized light is focused on an area in the magnetic metal layer 20C, and the plane of the linear polarized light rotates in accordance with the magnetic field direction of the area. The read-out is performed using the light with a plane of polarization rotated. The linear polarized light is rotated to be circular light or elliptically-polarized light at the light spot position as a result of a Kerr effect. The rotated plane of the circular light or elliptically-polarized light is read out, thereby allowing it to read out the magnetization direction of the recorded area. The optical system shown in FIG. 11 can be configured substantially according to a magnetooptical recording system. Thus, it is possible to record information on the recording medium 20 using a change in a polarization feature.

The metal layer 20A may be replaced with a phase change layer including a phase change material. In the recording medium 20 provided with the phase change layer, a strong light spot 20 is formed in the phase change layer to induce a phase change in a light-focused area, for example, a change from an amorphous phase to a crystalline phase, thus allowing it to record information in the focused area. For read-out, a light spot is directed to the phase-changed layer to monitor a change in reflectance of the phase-changed layer by detecting the reflected light from the phase-changed layer, thereby allowing it to read out information. Thus, it is possible to record information on the recording medium 20 using a change in the crystal state of the phase-changed layer.

Third Embodiment

Figure 12:
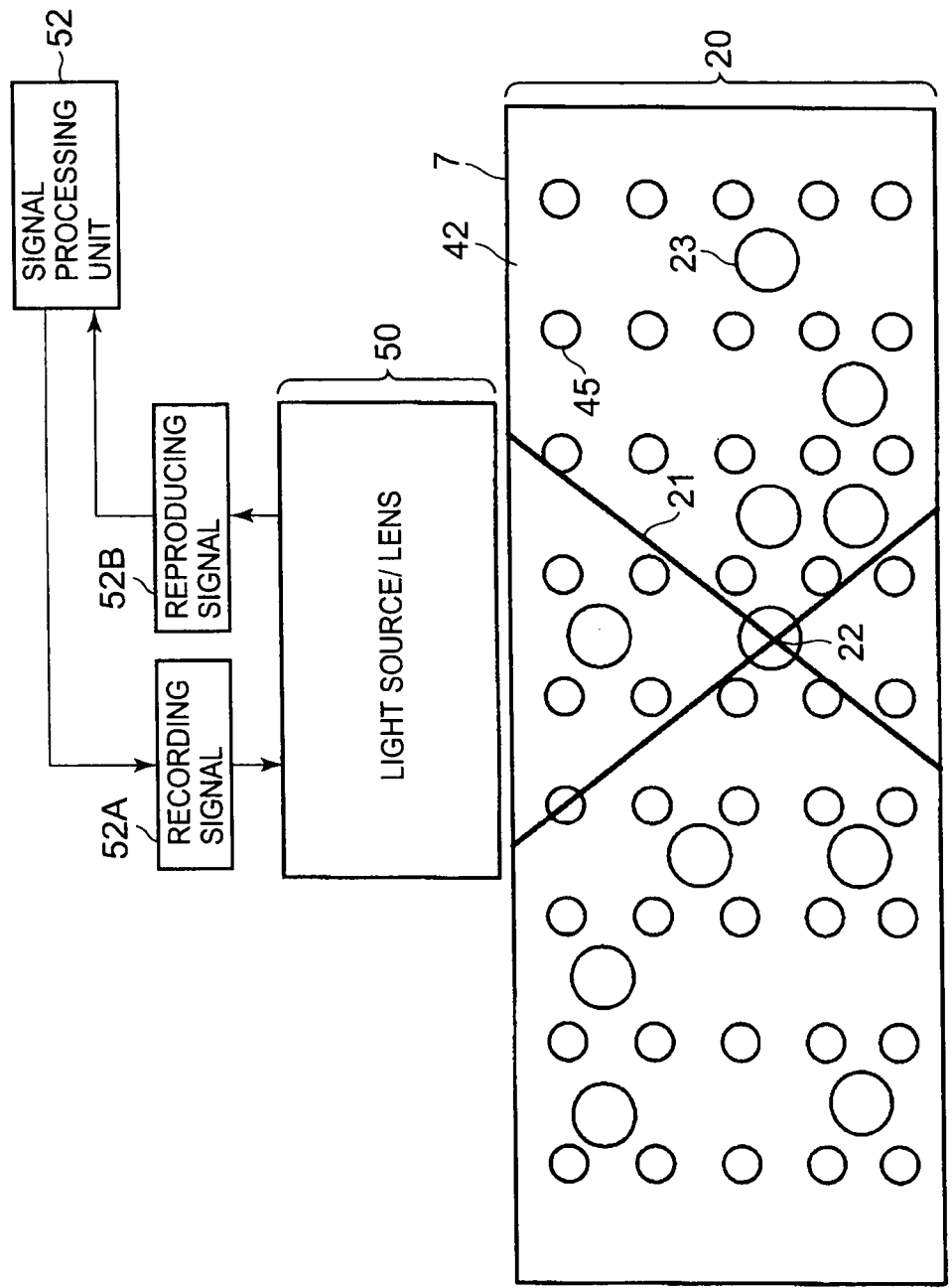
FIG. 12 is a view schematically illustrating an optical recording system according to a third embodiment of the invention.

FIG. 12 is a view schematically illustrating an optical recording system according to a third embodiment of the invention.

The recording media 20 shown in FIGS. 1 to 11 are formed of a laminated structure of the dielectric layer 20B and a metal layer or a semiconductor layer 20A, thereby forming a one-dimensional photonic crystal to effectively create a negative refractive index with a photonic band of the one-dimensional photonic crystal. However, methods for making an effective negative refractive index is not limited to the multilayer structure of the recording medium 20 shown in FIGS. 1 to 11, and can be modified variously. As shown in FIG. 12, the recording medium 20 is formed of a planer dielectric member 42, and may be provided with microstructures 45, which are formed of a metal or a semiconductor, regularly arrayed in a matrix therein, thus forming a two-dimensional or three-dimensional photonic crystal with an effectively negative refractive index. The microstructures 45 may be formed of metal spheres, for example, and the metal spheres may be regularly arrayed in the dielectric member. The microstructures 45 may be a split ring resonator 17, as shown in FIG. 2. The split ring resonator 17 shown in FIG. 2 includes an inner circular strip line 17A arranged concentrically and an outer circular strip line 17B. The inner and outer strip lines 17A, 17B lack a portion of each circular strip line. An effectively negative refractive index can be provided to the recording medium 20 with such a structure shown in FIG. 12. In addition, a recording medium is required to have a high cost-performance. Therefore, the multilayer structure shown in FIG. 1 is easier to manufacture than the structure shown in FIG. 12, and more advantageous for practical applications.

The multilayer optical recording system shown in FIG. 12 differs from the recording systems shown in FIGS. 1 to 11 only in the recording medium 20, and can employ the light sources and lenses in the recording systems shown in FIGS. 1 to 11.

However, it should be noted that the lens and the light source are drawn simply as a head 50 for write-in and read-out in FIG. 12. A recording signal 52A is supplied to the head 50 from a signal processing unit 52, and a read-out signal 52B is supplied to the signal processing unit 52 from the head 50 as well as a normal optical recording system. The head 50 is provided with a modulator (not shown) and a detector (not shown) as well as a normal optical head. The modulator modulates intensity or a polarization angle of laser light emitted from a semiconductor laser, etc. in accordance with the recording signal 52A. The detector monitors light reflected from the focused light spot 22 within the recording medium 20 to detect optical modulation or a change in the polarization angle of the reflected light, thus producing the read-out signal 52B.

Fourth Embodiment

Figure 13:
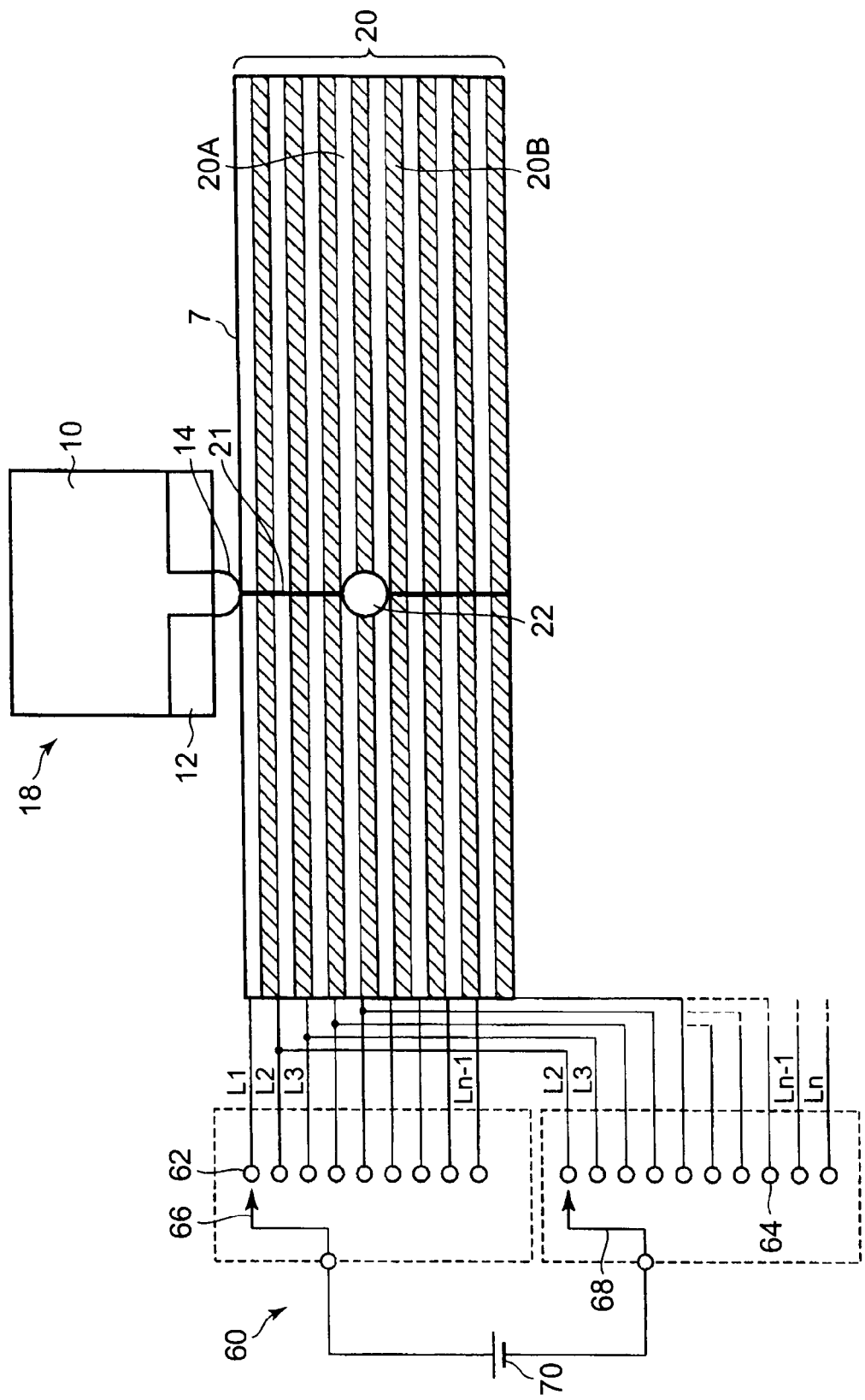
FIG. 13 is a view schematically illustrating a multilayer optical system according to a fourth embodiment of the invention.

FIG. 13 is a view schematically illustrating a multilayer optical system according to a fourth embodiment of the invention.

In the system shown in FIG. 13, the system lacks the lens unit 16, and is provided with the nano light source 14 in front of the recording medium, differently from the system shown in FIG. 1. The nano light source 14 focuses laser light to form a light spot with a diameter of 1 nm to 100 nm by passing the light through the nano holes. The nano light source 14 may be prepared without using the laser light source. That is, an aperture is made by forming a circular hole with a diameter of 1 nm to 100 nm in a metal film of Cr, Au, Ag, etc. to be placed in front of the recording medium. Then, a laser beam is guided from an optical fiber to the circular hole of the aperture, thus producing the nano light source 14. Alternatively, an end face of an optical fiber is covered with a metal film, and a circular hole with a diameter of 1 nm to 100 nm is formed in the end face to emit near-field light therefrom, thus producing the nano light source 14.

The recording medium 20 is arranged so as to be in contact with the nano light source 14, and is a plate of the layered structure having the dielectric member 20B, and the metal or semiconductor layer 20A. The layered structure provides the recording medium 20 with strong anisotropy of the dielectric constant thereof.

As already explained, a thickness ratio of the dielectric layer 20B to the metal or semiconductor layer 20A is appropriately designed to acquire a perpendicular dielectric constant 10 times larger than an in-plane dielectric constant for the recording medium 20. Such a large ratio of the two dielectric constants allows the light incident on the medium 20 from the nano light source 14 to propagate through the medium 20 without diffusing. Then the light keeps a narrow beam with a diameter less than the light diffraction limit within the medium 20, thereby creating a canalization phenomenon.

As shown in FIG. 13, in order to select a recording layer, a selection circuit 60 for write-in is provided. The write-in selection circuit 60 is provided with write-in lines L1 to Ln. The write-in lines L1 to Ln−1 are connected to contact terminals 62 of the first group, and simultaneously to the first to (n−1)th metals or semiconductor layers 20A. The write-in lines L2 to Ln are connected to contact terminals 64 of the second group, and simultaneously to the second to nth metals or semiconductor layers 20A. Sliders 66, 68 to select the contact terminals 62, 64 of the first and second groups are provided, and the sliders 66, 68 are connected to a voltage supply 70. The sliders 66, 68 collaborate to operate so that adjacent lines Li and L(i+1) (i=1 to (n−1)) are selected. Therefore, when the lines Li and L(i+1) (i=1 to (n−1)) are selected, a voltage is applied to the ith metal or semiconductor layer 20A and the (i+1)th metal or semiconductor layer 20A both are adjacent. A laser beam crosses the selected dielectric layer 20B to record the information bit 20B at this crossing point.

An electrochromic phenomenon can be employed for write-in. That is, an electrochromic material can be employed, as the material colors when a voltage is applied thereto, and otherwise the material is transparent. Only one electrochromic layer selected from the dielectric layers 20B colors when a voltage is applied to the electrochromic layer selected. The laser beam having canalized is absorbed by the dielectric layer 20B colored, thereby causing the electrochromic characteristic of the selected dielectric layer 20B to disappear. When a voltage is applied to a metal or semiconductor layer 20A, the selection of a layer for recording is performed depending on whether the dielectric layer 20B colors or not. The colored area of the dielectric layer 20B is further colored differently or transparently, thereby allowing it to record the information bit 23. Examples of electrochromic materials include oxides such as $WO_3$, $MoO_3$, and $Nb_2O_3$.

As another phenomenon for write-in, a creating phenomenon of lattice defects may be employed. As the dielectric layer 20B, materials such as ZnO, NiO, etc. with optical carriers easily induced are employed. In a material where optical carriers are easily induced, optical carriers are induced in a line along a laser beam having canalized in the material. Then, a voltage is applied to the dielectric layer 20B to accelerate the carriers therein. The carriers accelerated repeat collisions to create more carriers as a result of an avalanche effect, thereby creating many lattice defects. The lattice defects make an optical carrier inducing phenomenon take place more easily. Therefore, the lattice defects once created induces more carriers with the same laser beam. A current is measured with a lower voltage for an area where the optical carrier inducing phenomenon takes place, thereby allowing it to read out whether write-in is made on the area or not. It is preferable to employ semiconductors such as ZnO and NiO for a dielectric layer where many lattice defects are formed.

A material employed for the metal layer 16B needs to have a plasma resonant frequency higher than the frequency of the laser beam emitted from the nano light source 14. Specifically, metals such as Au, Ag, and Cu, or alloys of these may be employed for visible light. In addition, a metal layer 16B of highly doped transparent oxides such as MgO, ZnO, NiO, etc. with carrier induced therein may be employed for infrared light. A semiconductor layer 16B of highly doped semiconductors such as Si, ZnSe, GaAs, etc. with carriers induced therein may be employed for infrared light. It is more preferable to employ the semiconductor, as the plasma resonant frequency can be controlled by the doping level of the doped semiconductor with carriers induced.

Fifth Embodiment

Figure 14:
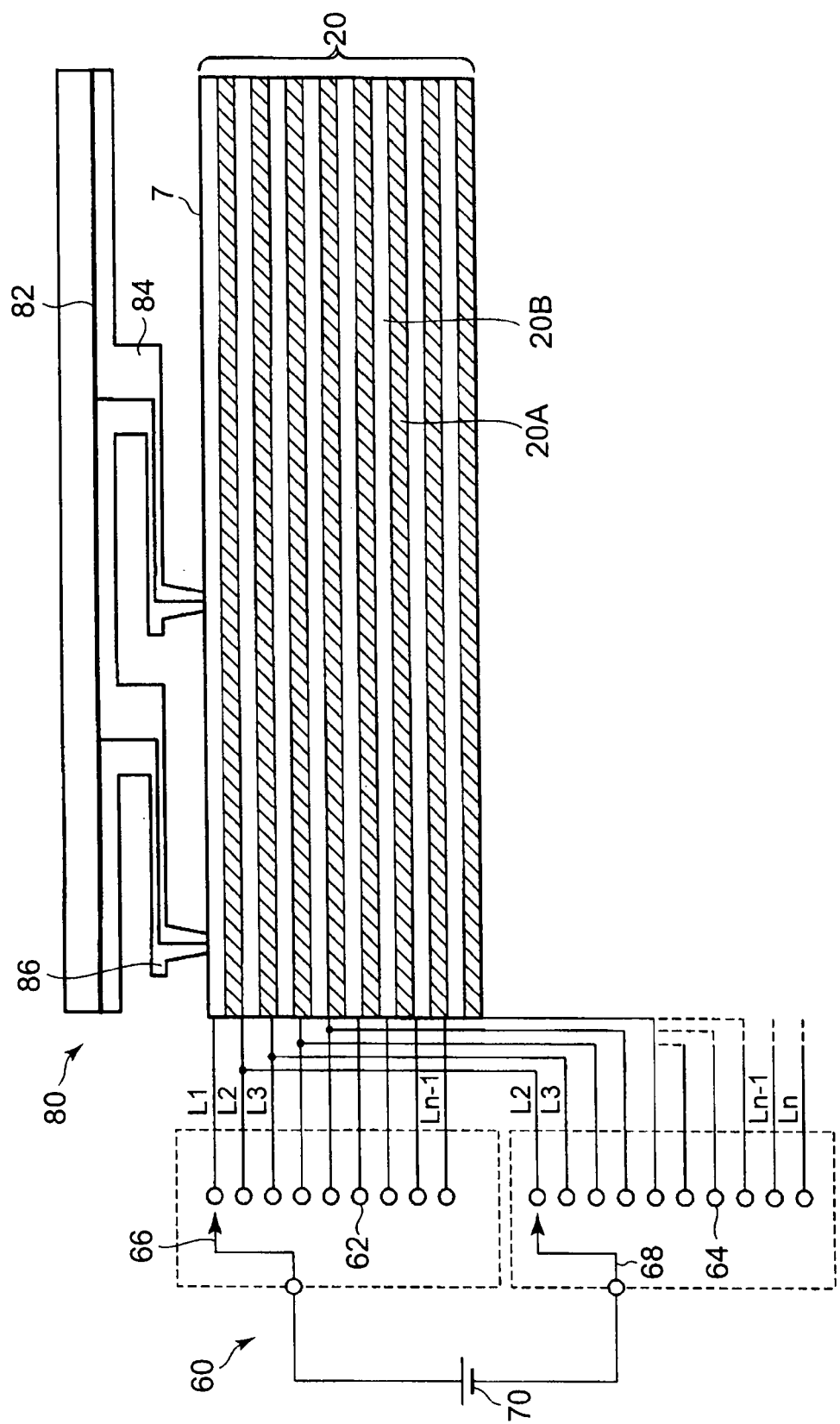
FIG. 14 is a view schematically illustrating a multilayer optical recording system according to a fifth embodiment of the invention.

FIG. 14 is a view schematically illustrating a multilayer optical recording system according to a fifth embodiment of the invention. As shown in FIG. 14, a multi-probe type head 80 can be employed for a write-in/read-out head. In a multi-probe type head 80, a laser beam is guided to a tip of a probe 86 via an optical guide 80. The nano hole is opened at a tip of a chip 84 of the probe 86, and near-field light spot 14 is formed therein. Alternatively, a plasmon lens may be formed at the tip of the chip 84 of the probe 86. Such a multi-probe type head 80 may also be driven by a MEMS mechanism. Furthermore, a multilayer optical system may be elaborated to a chip like a MEMS memory.

Sixth Embodiment

Figure 15:
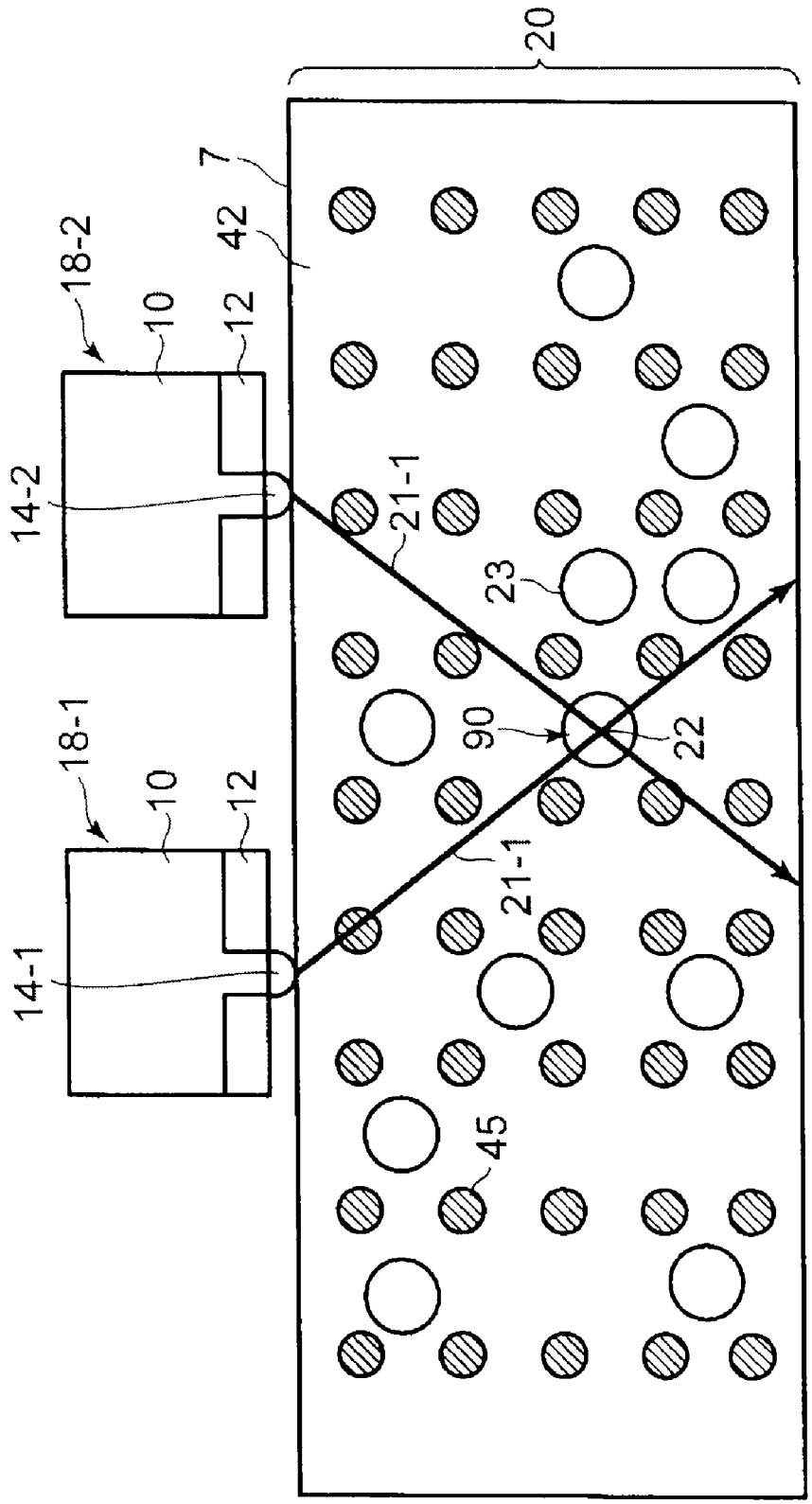
FIG. 15 is a view schematically illustrating a multilayer optical recording system according to a sixth embodiment of the invention.

FIG. 15 is a view schematically illustrating a multilayer optical recording system according to a sixth embodiment of the invention. In the multilayer optical recording system shown in FIG. 15, a multilayer structure of the dielectric layer 20B, and the metal or semiconductor layer 20A is employed for the recording medium 20, thus causing a canalization phenomenon. However, the canalization phenomenon is not limited to this. The phenomenon may take place in a regularity structure shown in FIG. 15 where the metal or semiconductor microstructures 45 are arranged regularly in the dielectric member 42 to form a two-dimensional or three-dimensional photonic crystal in the recording medium 20.

In the multilayer optical recording system shown in FIG. 15, metal spheres 45 are arranged regularly in the dielectric member 42, thereby causing the canalization phenomenon. In such a structure, an arrangement of the microstructures 45 is optimized to allow it to set two or more directions in which the canalization phenomenon takes place. More specifically, in the structure shown in FIG. 15, the recording medium has the metal or semiconductor microstructures 45 to be arranged therein, and has, therefore, no individual layer conceptually, thereby disenabling it to apply a voltage to each microstructure 45. For this reason, it is preferable to prepare two or more nano light source units 18-1, 18-2. Then, the nano light source units 18-1, 18-2 preferably emit nano laser beams from the nano light sources 14-1, 14-2 into the recording medium 20. The laser beams 21-1, 21-2 are emitted from two or more directions in which the canalization phenomenon takes place to record information and reproduce the information recorded at a cross-point of the laser beams. The laser beams 21-1, 21-2 from different directions are directed to the cross-point 90 to create a two-photon absorption phenomenon in the area at the cross-point, thereby enabling it to record information bit 23 in the dielectric area at the cross-point and reproduce the recorded information from the dielectric area at the cross-point.

The dielectric layer 42 may be formed of a two-photon absorption material, e.g., an organic two-photon absorption material. Specifically, the two-photon absorption organic materials include diallylethene and PMMA doped with diallylethene, i.e., photochromic materials for the dielectric layer 42. It is also possible to follow a change in a refractive index by photoisomerization reaction using urethane-urea copolymer. In addition, a photorefractive material may be employed. The photorefractive material changes its refractive index according to electron localization. It is also possible to employ an isomerization material, fluorescence dye, etc. where a change from trans-isomer into cis-isomer causes a change in the refractive index thereof.

When the material of which fluorescence characteristic changes is employed for the dielectric layer 42, it is possible to change the fluorescence characteristic of an area irradiated with a laser spot by producing a light spot with a high energy density in the recording medium 20 using a femtosecond or picosecond laser as a light source. The change in the fluorescence characteristic allows it to record information. Even when using the material of which fluorescence characteristic changes, a two photon absorption phenomenon can be employed for read-out of information. It is possible to read out information by detecting a two-photon fluorescent emission from the portion once irradiated with a light spot for write-in. A light spot with energy lower than the energy of the light spot for write-in is used for the detecting, i.e., read-out.

The sequence of write-in/read-out can conform to a method of a conventional three-dimensional optical recording. According to the above-mentioned embodiments of the invention, it is possible to perform write-in/read-out with a microscopic bit whose size exceeds the diffraction limit of light.

It should be noted additionally in the above-mentioned embodiments that the recording medium 20 has a higher cost performance when it is manufactured as a multilayer structure.

What is claimed is:

1. A multilayer optical recording system to record information with light, comprising:
   a recording medium with a flat principal plane, having a second dielectric member in which second microstructures are implanted, the second microstructures being formed of a metal or a semiconductor to be arranged periodically in a direction substantially perpendicular to the principal plane of the recording medium;
   a lens unit to be in contact with the principal plane or to have a gap with the principal plane, including a metamaterial lens or a plasmon lens, the metamaterial lens having a first dielectric member in which first microstructures are implanted in a substantially regular manner to form a nano spot within the recording medium, the nano spot forming an information bit, the first microstructures being formed of a metal or a semiconductor, the plasmon lens having an aperture, the aperture being a hole or a slit created in a metal film; and
   a microscopic drive unit configured to adjust a relative position between the lens unit and the recording medium to form a light spot in the second dielectric member or the second microstructures.

2. The system according to claim 1, wherein a period of the microstructures arranged is less than a half of a wavelength of the light in the second dielectric member.

3. The system according to claim 1, wherein the light spot changes one selected from the group of a refractive index, a polarization characteristic, a crystalline state, a molecular state, a magnetic state, a ferroelectric polarization state of the second dielectric member or the second microstructure.

4. The system according to claim 1, wherein the recording medium has a negative refractive index at least in a specific direction to incident light from the principal plane.

* * * * *